Oct. 7, 1930.   H. L. PHILLIPS   1,777,624
PULLEY
Filed Nov. 26, 1929    2 Sheets-Sheet 1
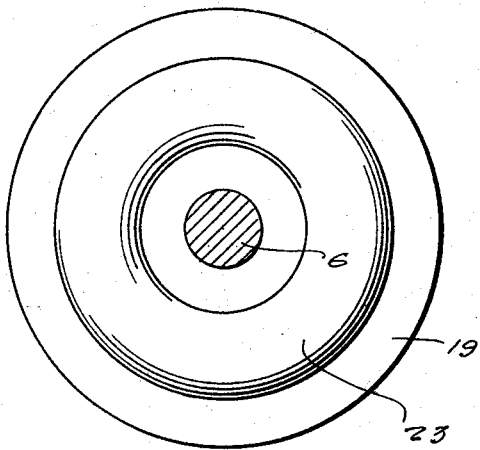
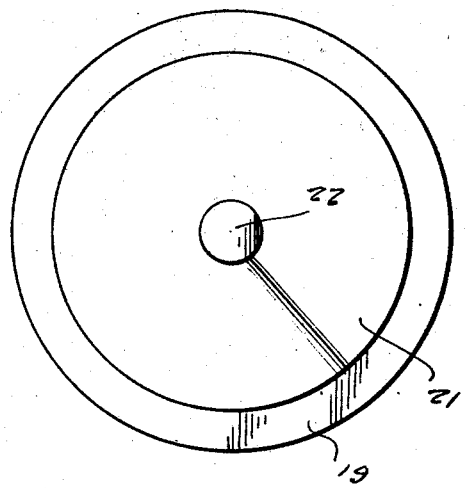
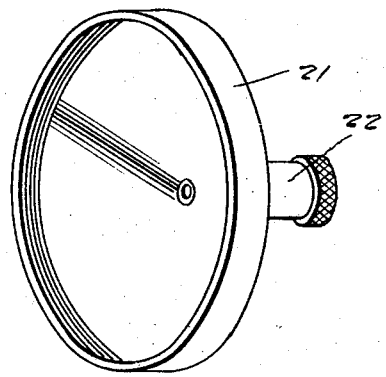
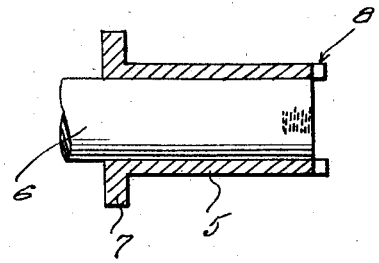
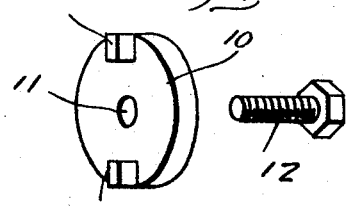
Inventor
Homer L. Phillips
By *Clarence A. O'Brien*
Attorney Oct. 7, 1930.    H. L. PHILLIPS    1,777,624
PULLEY
Filed Nov. 26, 1929    2 Sheets-Sheet 2

Inventor
Homer L. Phillips

By *Clarence A. O'Brien*
Attorney

Patented Oct. 7, 1930

1,777,624

UNITED STATES PATENT OFFICE

HOMER L. PHILLIPS, OF RONCEVERTE, WEST VIRGINIA

PULLEY

Application filed November 26, 1929. Serial No. 409,850.

The present invention relates to pulleys adapted particularly as an idler pulley for motion picture machines and has for its principal object to provide a ball bearing pulley having lubricating means associated therewith embodying a shield to prevent contact of the lubricant with the belt carried by the pulley.

One of the important objects of the invention is to provide a pulley assembly of a simple and practical construction, which is strong and durable, efficient in performance, which may be readily assembled and disassembled for the replacement of the parts, inexpensive to manufacture and otherwise well adapted for the purposes for which the same is intended.

Figure 3:
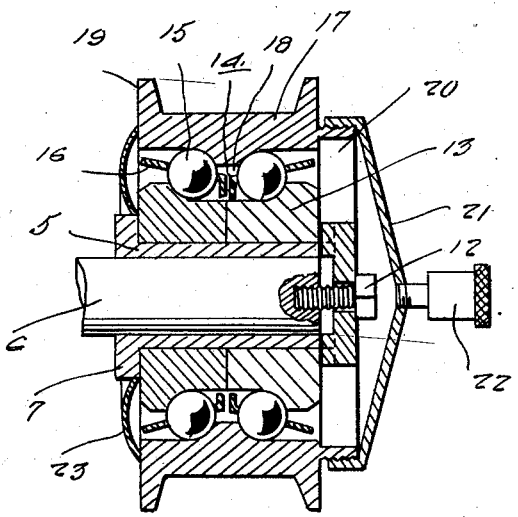
Figure 4:
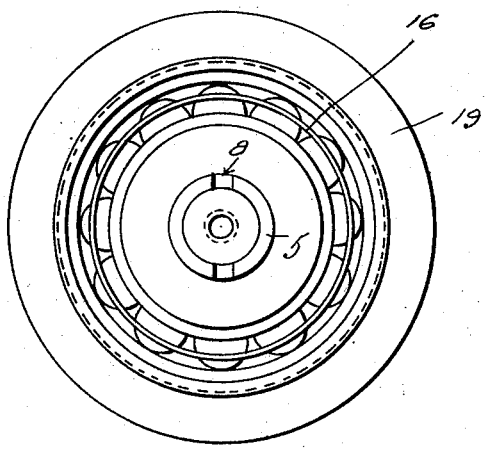
Figure 7:
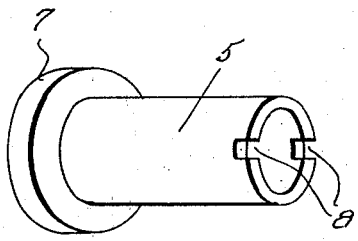

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a side elevational view showing the side of the pulley provided with the grease cup, Figure 2 is a similar view of the opposite side of the pulley, Figure 3 is a vertical sectional view therethrough, Figure 4 is an elevational view of the front side of the pulley with the grease shield removed, Figure 5 is a perspective view of the grease shield, Figure 6 is a sectional view through the bushing, Figure 7 is a perspective view of the bushing, and Figure 8 is a group perspective view of the locking plate and set screw for securing the pulley upon the bushing.

Referring to the drawings for the purpose of illustration I have disclosed a preferred embodiment of the invention which includes a bushing 5 carried on a pulley stud 6, one end of the bushing being provided with a flange 7. The opposite end of the bushing is formed with a pair of recesses 8 at diametrically opposite sides thereof for receiving sheaths 9 on one face of a locking plate 10, the plate having a metal opening 11 therein for receiving a set screw 12 for threading into the end of the stud 6.

The diameter of the plate 10 is substantially equal to the flange 7 so that the plate will cooperate with the flange in retaining the pulley upon the bushing.

The pulley is constructed of a pair of transversely split inner bushing rings 13, the periphery of which, adjacent their abutting sides being formed with a channel 14 providing a raceway for a set of ball bearings 15.

The ball bearings are retained in spaced relation within the channel or raceway by a pair of annular spacing members 16.

An outer ring member 17 is positioned for rotation upon the ball bearing, the inner periphery of the ring member 17 being formed with an annular rib 18 positioned between the bearing of the respective inner rings 13 as will be clearly seen from an inspection of Figure 3 of the drawings.

The outer edges of the outer ring member 17 are formed with flanges 19 between which a belt is adapted to seat, as will be readily understood.

To the outer face of the outer ring member 17 is formed an annulus 20 having its outer periphery threaded for threadedly receiving a grease shield 21.

At the center of the shield is fitted a grease nipple 22 by means of which a suitable lubricant may be fed to the outer side of the pulley assembly for working between the inner and outer ring members to suitably lubricate the ball bearing.

At the opposite side of the pulley is positioned a grease shield 23 bridging the space between the inner and outer ring members to prevent the escape of the lubricant from the inner side of the pulley.

It will be apparent that upon the removal of the outer grease shield 21 that the parts of the pulley may be disassembled by first removing the set screw 12 and the locking plate 10 whereby the ring members may be separated and thus replaced or repaired when necessary.

Furthermore through the provision of the lubricant the pulley will not get hot through use and the grease shield at each side of the pulley will prevent the grease from coming in contact with the belt.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A pulley comprising in combination, a mounting, a bushing disposed thereon having a flange at one end and diametrically opposed recesses in the other end, a pulley locking plate having inward projections engageable with said recesses in the end of the bushing, said plate cooperating with the flange for retaining the pulley upon the bearing, to prevent rotation of the locking plate and a set screw inserted through the plate and engageable with the mounting for retaining the plate thereon.

2. A pulley assembly comprising in combination, a stud mounting, a bushing carried thereby, a flange at one end of the bushing, a pulley carried by the sleeve and comprising a plurality of ring members having bearing means interposed therebetween, one of said ring members having a threaded annulus formed at one side thereof, a grease shield threaded through the annulus and provided with a grease cup for feeding lubricant through the shield for contact with the bearing means and locking means for the opposite end of said bearing comprising a locking plate, cooperating means carried by the bearing and the plate to prevent rotation of the plate and a set screw inserted through the plate in threaded engagement with the stud mounting for retaining the plate in position thereon.

3. A pulley assembly comprising in combination, a stud mounting, a bushing carried thereby, a flange at one end of the bushing, a pulley including a plurality of inner ring members mounted upon the bearing having a channel formed in the periphery thereof, an outer ring member having a rib formed on the inner periphery thereof for spacing a double set of ball bearings within said channel, a threaded annulus formed on one side of said outer ring member, a grease shield threaded to said annulus and having a grease cup for feeding lubricant within the shield and a grease shield at the side of the pulley opposite from said annulus and bridging the space between said inner and outer ring members to prevent escape of heat therefrom.

In testimony whereof I affix my signature.

HOMER L. PHILLIPS.